(12) United States Patent
Wei et al.

(10) Patent No.: US 11,105,038 B2
(45) Date of Patent: Aug. 31, 2021

(54) FIBER REINFORCED PLASTIC ENHANCED BY FUNCTIONALIZED PARTICLE

(71) Applicant: PALO ALTO RESEARCH CENTER INCORPORATED, Palo Alto, CA (US)

(72) Inventors: Junhua Wei, Mountain View, CA (US); Gabriel Iftime, Dublin, CA (US); Jessica Louis Baker Rivest, Palo Alto, CA (US); Sean Roark Garner, San Francisco, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 126 days.

(21) Appl. No.: 16/228,456

(22) Filed: Dec. 20, 2018

(65) Prior Publication Data
US 2020/0199811 A1 Jun. 25, 2020

(51) Int. Cl.
*D06M 15/55* (2006.01)
*C08G 59/14* (2006.01)
*D06M 101/06* (2006.01)
*D06M 101/16* (2006.01)
*D06M 101/40* (2006.01)

(52) U.S. Cl.
CPC ......... *D06M 15/55* (2013.01); *C08G 59/1405* (2013.01); *D06M 2101/06* (2013.01); *D06M 2101/16* (2013.01); *D06M 2101/40* (2013.01)

(58) Field of Classification Search
CPC .............. C08G 59/1405; D06M 15/55; D06M 2101/06; D06M 2101/16; D06M 2101/40; C08J 5/04; C08K 7/06; C08K 3/042; C09K 5/14; C08L 2201/14
USPC ........................................................ 523/200
See application file for complete search history.

(56) References Cited

U.S. PATENT DOCUMENTS

| | | | | |
|---|---|---|---|---|
| 10,882,972 | B2* | 1/2021 | Wei | C08L 33/08 |
| 2015/0037530 | A1* | 2/2015 | Zhamu | D01D 5/04 |
| | | | | 428/113 |
| 2015/0086881 | A1 | 3/2015 | Zhamu et al. | |
| 2015/0166743 | A1* | 6/2015 | Restuccia | B29C 70/025 |
| | | | | 428/327 |
| 2015/0337183 | A1* | 11/2015 | Pratte | C09J 171/00 |
| | | | | 156/60 |
| 2015/0375481 | A1* | 12/2015 | Boursier | B32B 5/12 |
| | | | | 428/76 |
| 2016/0017128 | A1* | 1/2016 | Unal | C07F 7/08 |
| | | | | 524/114 |
| 2017/0058070 | A1 | 3/2017 | Iftime et al. | |
| 2019/0194417 | A1* | 6/2019 | Wei | C08G 59/50 |
| 2020/0024494 | A1* | 1/2020 | Iftime | B32B 27/20 |

FOREIGN PATENT DOCUMENTS

| | | |
|---|---|---|
| EP | 0 525 418 A1 | 2/1993 |
| EP | 2 256 163 A1 | 12/2010 |
| EP | 3 502 202 A1 | 6/2019 |
| WO | 03059993 A1 | 7/2003 |
| WO | 2015179618 A1 | 11/2015 |
| WO | 2018080045 A1 | 5/2018 |
| WO | 2019203893 A2 | 10/2019 |

OTHER PUBLICATIONS

Feng, Wei et al., "Two-Dimensional Fluorinated Graphene: Synthesis, Structures, Properties and Applications" Advanced Science, vol. 3 (2016), 22 pp.
Chronopoulos, Demetrios D. et al., "Chemistry, properties, and applications of fluorographene," Applied Materials Today, vol. 9 (2017) pp. 60-70.
Novoselov, K.S., et al. "A roadmap for graphene," Nature, vol. 490 (Oct. 11, 2012), pp. 192-200.
Layek, Rama K. et al. "A review on synthesis and properties of polymer functionalized graphene," Polymer, vol. 54 (2013), pp. 5087-5103.
Young, Robert J. "The mechanics of graphene nanocomposites: A review," Composites Science and Technology, vol. 72 (2012), pp. 1459-1476.
Marcano, Daniela C. et al. "Improved Synthesis of Graphene Oxide," ACS Nano, vol. 4, No. 8, (Jul. 22, 2010), pp. 4806-4814.
Ling, Xi et al. "Lighting Up the Raman Signal of Molecules in the Vicinity of Graphene Related Materials," American Chemical Society, vol. 48 (2015), pp. 1862-1870.

* cited by examiner

*Primary Examiner* — Hannah J Pak
(74) *Attorney, Agent, or Firm* — Miller Nash LLP

(57) ABSTRACT

A composition of matter has a fiber structure impregnated with a polymer, the polymer having dispersed functionalized particles chemically bonded to the polymer, wherein the functionalized particles contain one of either groups same as a precursor of the polymer, or groups reactive with a precursor. A composition of matter has a fiber structure impregnated with cured epoxy resin having dispersed functionalized particles chemically bonded to the cured epoxy, wherein the functionalized particles contain one of either groups same as the epoxy resin, or groups reactive with the epoxy resin.

10 Claims, No Drawings

FIBER REINFORCED PLASTIC ENHANCED BY FUNCTIONALIZED PARTICLE

TECHNICAL FIELD

This disclosure relates to fiber reinforced plastic (FRP), more particularly to fiber reinforced plastic enhanced by a functionalized material.

BACKGROUND

Fiber reinforced plastics (FRPs) are widely used today for fabrication of lightweight structures. They offer high mechanical properties per weight. They have disadvantages in that they are expensive and only perform the function of improving mechanical properties.

As there are two parts of material in the FRP, the fiber and the plastic, two different approaches can reduce the costs. First, one can increase the mechanical properties of the fibers. This in principle reduces the cost because it decreases the amount of FRP required to achieve the same results as FRPs with higher amounts of fiber reinforcement. However, currently the costs of high-strength fibers remain too high, and, as a result, only niche applications use them. The cost of using high-strength fiber is far above the saving of using less fiber or FRP. So this method, does not work for the immediate future.

A second approach consists in reinforcing the plastic with additives, typically by incorporation of strengthening additives into the resin material. This method is simple and has the potential to provide significant increase in the mechanical properties for a relatively low added cost. However, a problem lies in the loading of the additive between fibers, which limits the attainable improvement. FRPs with high loading of strengthening additives cannot be achieved currently because of the poor dispersibility of the additive in epoxy resins.

FRPs are mainly used in structures as strong and stiff support materials. FRPs with additional functionalities and simultaneous high mechanical performance will enable a new range of advantages beyond just mechanical strength. Using additives can also achieve specific functions, like gas barrier property, i.e. reduced gas permeability, in-plane electro conductivity, and any through-plane properties. However, the additives that enable these properties normally decrease the specific mechanical properties of FRP. Fabrication of FRPs that are simultaneously low cost, high strength, and possess additional desired functionalities requires high loading of additive, which is not achievable with current techniques.

SUMMARY

According to aspects illustrated here, there is provided a composition of matter, having a fiber structure impregnated with a polymer, the polymer having dispersed functionalized particles chemically bonded to the polymer, wherein the functionalized particles contain one of either groups same as a precursor of the polymer, or groups reactive with a precursor.

According to aspects illustrated here, there is provided a composition of matter having a fiber structure impregnated with cured epoxy resin having dispersed functionalized particles chemically bonded to the cured epoxy, wherein the functionalized particles contain one of either groups same as the epoxy resin, or groups reactive with the epoxy resin.

DETAILED DESCRIPTION OF THE EMBODIMENTS

Embodiments here introduce functionalized particles into the plastic of fiber reinforced plastic (FRP). The plastic is the weakest part of FRP and serves as the integrator of the fibers that transfers forces and cracks to the fibers. Reinforcing the plastic enhances the FRPs mechanical properties. By choosing particles with specific functions, multifunctional FRPs with enhanced mechanical properties become achievable.

One embodiment comprises a composition of matter having a fiber structure impregnated with a polymer, the polymer having dispersed functionalized particles, wherein the functionalized particles contain one of either groups same as a precursor of the polymer, or groups reactive with the precursor. As used here, groups the same as a precursor means that the functional groups of the same material as the polymer precursor used to form the plastic. As used here, the term 'reactive with' means that the functional groups react with the polymer precursor such that some portion of the precursor or the functional group is consumed.

The functionalized particles are dispersible in the polymer precursor which allows the particles to disperse through the polymer in the cured state, to produce a structure wherein the particles are chemically bonded to the polymer.

As mentioned above, the functionalized particles enable additional functionalities in addition to mechanical strengthening. For example, the functionalized particles enable at least one of gas barrier, in other words reduced gas permeability, in-plane electro conductivity, and through-plane functionalities. One example of desired through-plane functionalities is thermal conductivity.

The fiber may have one of many structures. These include, without limitation: single fiber, tow of fiber, and fabric. A tow of fibers as used here means a group of several fibers, typically in the thousands. The term fabric may include fabric with patterns that are, without limitation: unidirectional pattern; plain; 1×1, 2×2 twill weave; 4 Harness-Satin; 5 Harness-Satin; 8 Harness-Satin pattern; and 4×4 twill weave.

The functionalized particles may be carbon particles, ceramic particles; mineral particles; polymer particles; and combinations thereof. Examples of carbon particles include, without limitation: graphite; graphene; carbon nanotubes; and fullerene. Examples of glass particles may include, without limitation: silica; kaolin group clay; smectite group clay; illite group clay; chlorite group clay; and aluminum oxide. Examples of polymer fibers may include, without limitation: linear polymers; dendrites; branch polymers; and copolymers.

The fiber may comprise carbon fibers, ceramic fibers, and polymer fibers. Examples of carbon fibers may include, without limitation, carbon fibers and graphite fiber. An example of ceramic fibers may comprise glass fibers. Examples of polymer fibers include; aramid; cellulose fiber; collagen fiber and fiber in polymer shape.

One embodiment may be a cured composition of matter having a fiber impregnated with cured epoxy resin having dispersed functionalized particles, wherein the functionalized particles contain one of either groups same as the epoxy resin, or groups reactive with the epoxy resin. In this embodiment, the functionalized particles chemically bond to the epoxy resin. All of the variations above would apply to this embodiment.

Other embodiments may include cured or curable polymers. In one embodiment the polymer may be a thermoplastic, including, without limitation: polyether ether ketone; polyethylene 2,5-furandicarbonylate; nylon; polyimide; polybutylene terephthalate; polyphenylene sulfide; polyolefin; and acrylonitrile butadiene styrene. In one embodiment the polymer may be a thermoset material, including, without limitation: epoxy; polyester; polyurethane; vulcanized elastomer; silicone; and vinyl ester.

A one component epoxy system into which epoxy-functionalized particles (X=epoxy) contains epoxy precursor, a crosslinking catalyst such as an ionic liquid that include for example 1-ethyl-3-methylimidazolinium dicyanamide and any other additives as necessary for the intended application. A conventional two-part epoxy adhesive consist of a part A, epoxy precursor material, and a part B, hardener. The hardener is generally a multifunctional organic amine.

In one embodiment a curable formulation comprises a fiber impregnated with a one component epoxy mixture consisting of epoxy functionalized particles dispersed into an epoxy polymer precursor, further mixed with a crosslinking catalyst or curing initiator such as an ionic liquid that include for example 1-ethyl-3-methylimidazolinium dicyanamide.

In another embodiment, a curable formulation comprises a fiber impregnated with a conventional two-part epoxy adhesive comprising a part A, epoxy precursor material, and a part B, hardener into which functionalized particles are dispersed. The hardener is generally a multifunctional organic amine. In this embodiment, the functional particles contain either epoxy functional groups or amino functional groups. The curing is initiated by the reaction between the amino groups and epoxy groups both those present in the base materials and those present onto the surface of the particles.

As discussed previously, one of the limitations of the current approaches is the inability to load the plastic with the particles. Current approaches generally can only reach about 1 wt % of particles in the overall epoxy resin. In the approaches here, the functionalized particles can reach loading of 5 wt % of the epoxy resin still with noticeable mechanical properties improvement. In one embodiment, the polymer has at least 10 wt % of the functionalized particles.

Example 1

In this example, epoxy reacted fluorographene (ERFG) was prepared using the approach set out in co-pending patent application Ser. No. 16/225,125. Commercially available epoxy resin Fiber Glast 2000 (Part A) and 2060 (Part B) were used without further treatment. Different ratios of EFRG were added into the Fiber Glast 2000 system to prepare resins with weight percent of ERFG at 0%, 5%, and 10%. The ERFG was first dispersed into the precursor Part A and then mixed with the Part B according to the amine to epoxy ratio to the Part A and ERFG. This mixture was used to impregnate the carbon fiber.

The 3K 2×2 twill weave carbon fiber fabric from Fiber Glast was used. The carbon fiber reinforced fiber (CFRP) was prepared by the wet layup method. The impregnated carbon fiber was packed into a vacuum bag at room temperature for 5 hours to remove extra resin and gas bubbles. It was then transferred to an over for another 5 hours at 100° C. to finish curing the epoxy resin. The cured CFRP was cut by a band saw equipped with a diamond blade into the desired shapes. The cut specimens were further sanded into the desired dimensions.

The mechanical properties of CFRP with different EFRG loadings were measured with a universal tester according to the standard ASTM 3039. At least 8 specimens of each ERFG concentration were tested, including through-plane thermal conductivity. The characterization results are summarized in the table below.

| Sample | Pure | 5% ERFG | 10% ERFG |
| --- | --- | --- | --- |
| Modulus (GPa) | 51.5 | 55.1 | 61.6 |
| Strength (MPa) | 500.7 | 536.3 | 589.2 |
| Thermal Conductivity (W/m * k) | 0.425 | 0.578 | 0.677 |

CFRP made with epoxy resin containing 5 wt % ERFG and 10% ERFG show increases in their mechanical performance and of their thermal conductivity. The improved mechanical properties are the direct result of the use of strong and stiff graphene particles as reinforcements for the epoxy resin. As the thermal conductivity of the graphene is far higher than the pure epoxy, the increase of loading of ERFG further improved the overall through-plane thermal conductivity of the CFRP. The increase in both the mechanical and thermal properties indicates good dispersion of the ERFG into the epoxy resin.

Compared to polymers without dispersed functionalized particles, the polymers having dispersed functional particles has shown at least at 30% improvement in thermal conductivity; at least a 15% improvement in tensile strength, shear strength, elastic modulus, compressive strength, and compressive modulus; and 50 times lower hydrogen gas permeability. The improvement of gas permeability is at least 2 times what it would be if the polymer did not have dispersed functionalized particles. The polymer may be a cured epoxy resin.

In this manner, FRP with improved mechanical properties can be attained. The embodiments may use less fiber or use a smaller FRP structure. The resulting FRP is stronger and can also enable multifunctionalities for the material. By adding the additive, not only the interlayer mechanical properties, and toughness is increased, but also the strength and modulus increased which is different from the current state-of-the-art. This may also reduce the material usage.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A composition of matter, comprising a fiber structure impregnated with a polymer, the polymer having dispersed functionalized particles of one of carbon, ceramic, mineral, or glass chemically bonded to the polymer, wherein the functionalized particles contain functional groups same as a precursor of the polymer, wherein the polymer has at least 10 wt % of functionalized particles, and the fiber structure has a shape that is one of a single fiber, a tow of fiber, and a fabric having a pattern of at least one of a unidirectional pattern, a 1×1 pattern, a 2×2 twill weave pattern, a 4 Harness-Satin pattern, a 5-Harness-Satin pattern, an 8 Harness-Satin pattern, and a 4×4 twill weave pattern, and the fiber structure is selected from the group consisting of carbon-based fiber, graphite fiber, ceramic fiber, glass fiber, cellulose fiber, collagen fiber, and polymer in fiber shape.

2. The composition of matter as claimed in claim 1, wherein the polymer having dispersed functionalized particles also shows at least a 30% improvement in thermal conductivity when compared to a polymer without dispersed functionalized particles containing functional groups same as a precursor of the polymer in a composition of matter comprising a fiber structure.

3. The composition of matter as claimed in claim 1, wherein the polymer having functionalized particles also shows at least a 15% improvement on the in tensile strength when compared to a polymer without dispersed functionalized particles containing functional groups same as a precursor of the polymer in a composition of matter comprising a fiber structure.

4. The composition of matter as claimed in claim 1, wherein the polymer having functionalized particles also shows at least a 15% improvement on the in shear strength, elastic modulus, compressive strength, and compressive modulus when compared to a polymer without dispersed functionalized particles containing functional groups same as a precursor of the polymer in a composition of matter comprising a fiber structure.

5. The composition of matter as claimed in claim 1, wherein the polymer having dispersed functionalized particles show at least a 2 times decrease in gas permeability when compared to a polymer without dispersed functionalized particles containing functional groups same as a precursor of the polymer in a composition of matter comprising a fiber structure.

6. The composition of matter as claimed in claim 1, wherein the polymer is a thermoplastic selected from the group consisting of: polyether ether ketone, polyethylene 2,5-furandicarbonylate, nylon, polyimide, polybutylene terephthalate, polyphenylene sulfide, polyolefin, and acrylonitrile butadiene styrene.

7. The composition of matter as claimed in claim 1, wherein the polymer is a thermoset material selected from a group including epoxy, polyester, polyurethane, vulcanized elastomer, silicone, and vinyl ester.

8. The composition of matter as claimed in claim 1, wherein the functionalized particles are selected from the group consisting of: graphite, graphene, carbon nanotubes, fullerene, silica; kaolin group clay, smectite group clay, illite group clay, chlorite group clay, aluminum oxide, and combinations thereof.

9. A composition of matter, comprising a fiber structure impregnated with a one-component epoxy polymer precursor and a crosslinking catalyst that is an ionic liquid, the polymer precursor having dispersed functionalized particles of one of carbon, ceramic, mineral, or glass, wherein the functionalized particles contain epoxy functional groups, the polymer having at least 10 wt % of functionalized particles.

10. A composition of matter comprising a fiber structure impregnated with a polymer precursor and a hardener, the polymer precursor having dispersed functionalized particles of one of carbon, ceramic, mineral, or glass, wherein the functionalized particles contain epoxy functional groups, the polymer precursor is part A of a two-part epoxy adhesive, the hardener is a multifunctional organic amine, and the polymer has at least 10 wt % of functionalized particles.

* * * * *